(12) United States Patent
Brown et al.

(10) Patent No.: US 8,750,677 B2
(45) Date of Patent: Jun. 10, 2014

(54) METHOD FOR TRANSFERRING MEDIA PLAYBACK FROM A DIFFERENT DEVICE

(75) Inventors: Shawn M. Brown, Redmond, WA (US); Robert Pengelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 106 days.

(21) Appl. No.: 13/216,126

(22) Filed: Aug. 23, 2011

(65) Prior Publication Data
US 2013/0051755 A1 Feb. 28, 2013

(51) Int. Cl.
*H04N 5/92* (2006.01)
*H04N 5/93* (2006.01)

(52) U.S. Cl.
USPC .......................................... 386/241; 386/248

(58) Field of Classification Search
USPC .......... 386/241, 239, 240, 243, 248, 230, 291
See application file for complete search history.

(56) References Cited

U.S. PATENT DOCUMENTS

| | | |
|---|---|---|
| 2005/0097618 A1 | 5/2005 | Arling et al. |
| 2007/0153740 A1 | 7/2007 | Chang et al. |
| 2007/0266410 A1 | 11/2007 | Balfanz et al. |
| 2008/0200154 A1 | 8/2008 | Maharajh et al. |
| 2009/0138507 A1 | 5/2009 | Burckart et al. |
| 2009/0217336 A1* | 8/2009 | Chang et al. .................. 725/115 |
| 2010/0027966 A1 | 2/2010 | Harrang et al. |
| 2010/0057782 A1 | 3/2010 | McGowan et al. |
| 2010/0121891 A1 | 5/2010 | Zampiello |
| 2010/0277606 A1 | 11/2010 | DeLuca et al. |
| 2011/0091187 A1 | 4/2011 | Duffin et al. |

OTHER PUBLICATIONS

Apple Applies for Patent to Resume Media Playback on Another Device, (http://www.engadget.com/2010/05/28/apple-applies-for-patent-to-resume-media-playback-on-another-dev), May 28, 2010.
International Search Report dated Feb. 14, 2013, from International Patent Application No. PCT/US2012/052098, 3 pp.
Written Opinion dated Feb. 14, 2013, from International Patent Application No. PCT/US2012/052098, 4 pp.

* cited by examiner

*Primary Examiner* — Robert Chevalier
(74) *Attorney, Agent, or Firm* — Sung Kim; Andrew Sanders; Micky Minhas

(57) ABSTRACT

Transfer of media playback from a first device to a second device is based on a media entry point identifier. For example, a movie playing on a source device such as a movie theater screen may be quickly and easily transferred to a user's handheld device for playback on the handheld device or vice versa. Playback of the transferred media begins at or near a point within the transferred media at which the user requested media playback transfer. In one embodiment, media playback transfer relies on information captured from the source device, such as a video frame, a media progress bar, or a visual code. In another embodiment, the user device is associated with a user account that is different from the user account associated with the source device or the source device simply is not associated with a user account. In another embodiment, transfer of the media playback involves applying to the user device the settings of the source device.

20 Claims, 12 Drawing Sheets

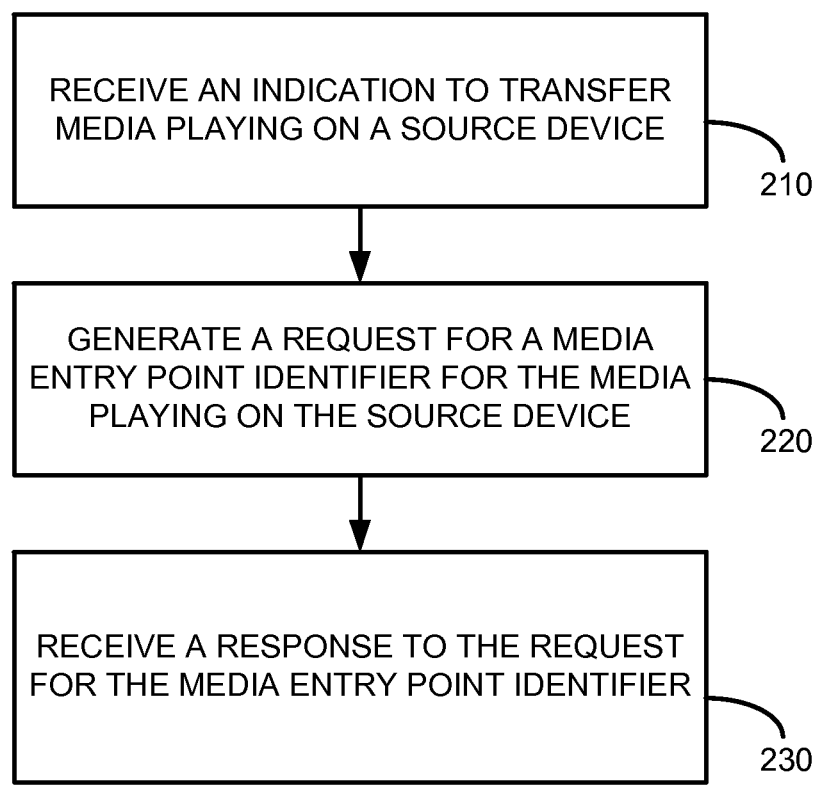

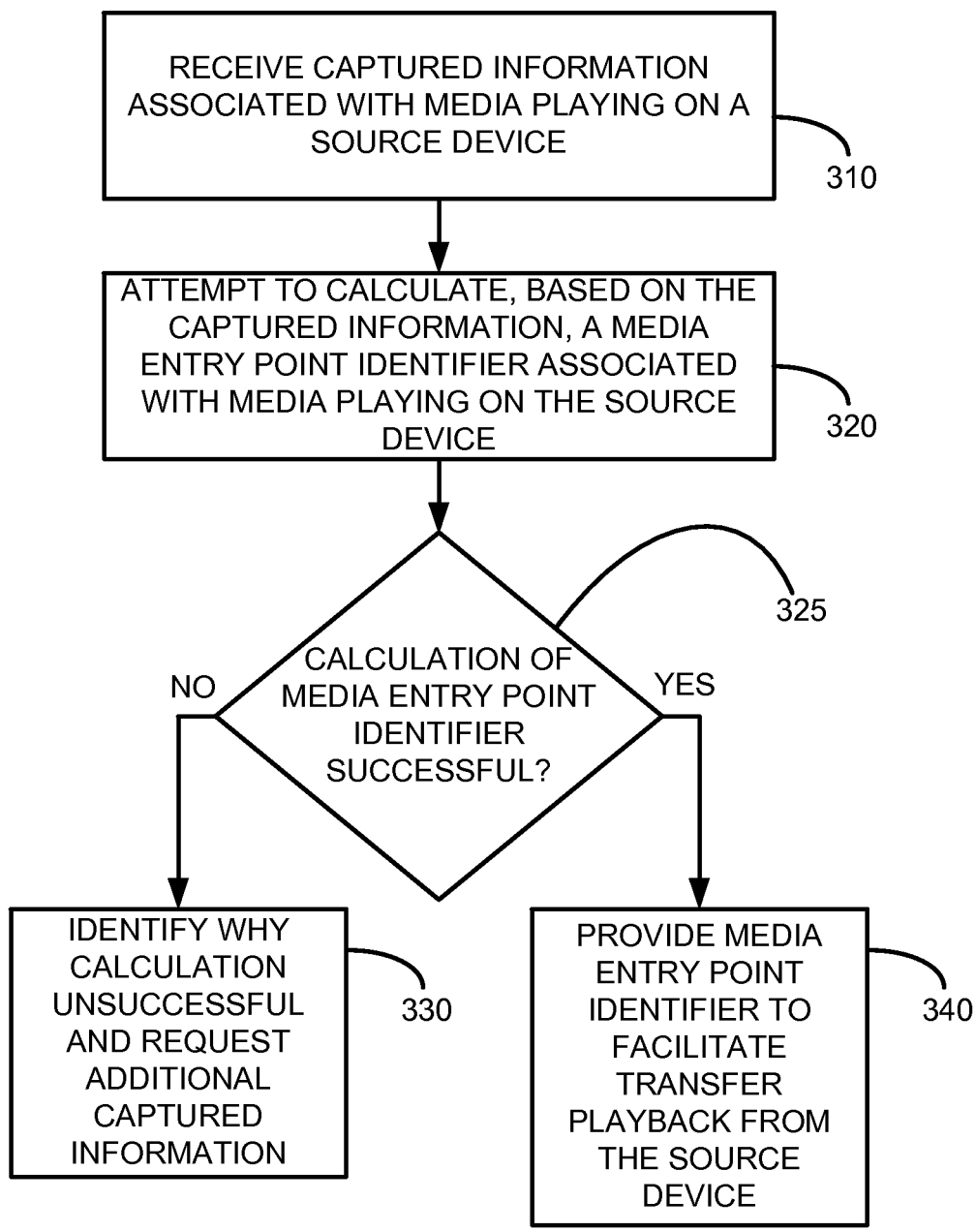

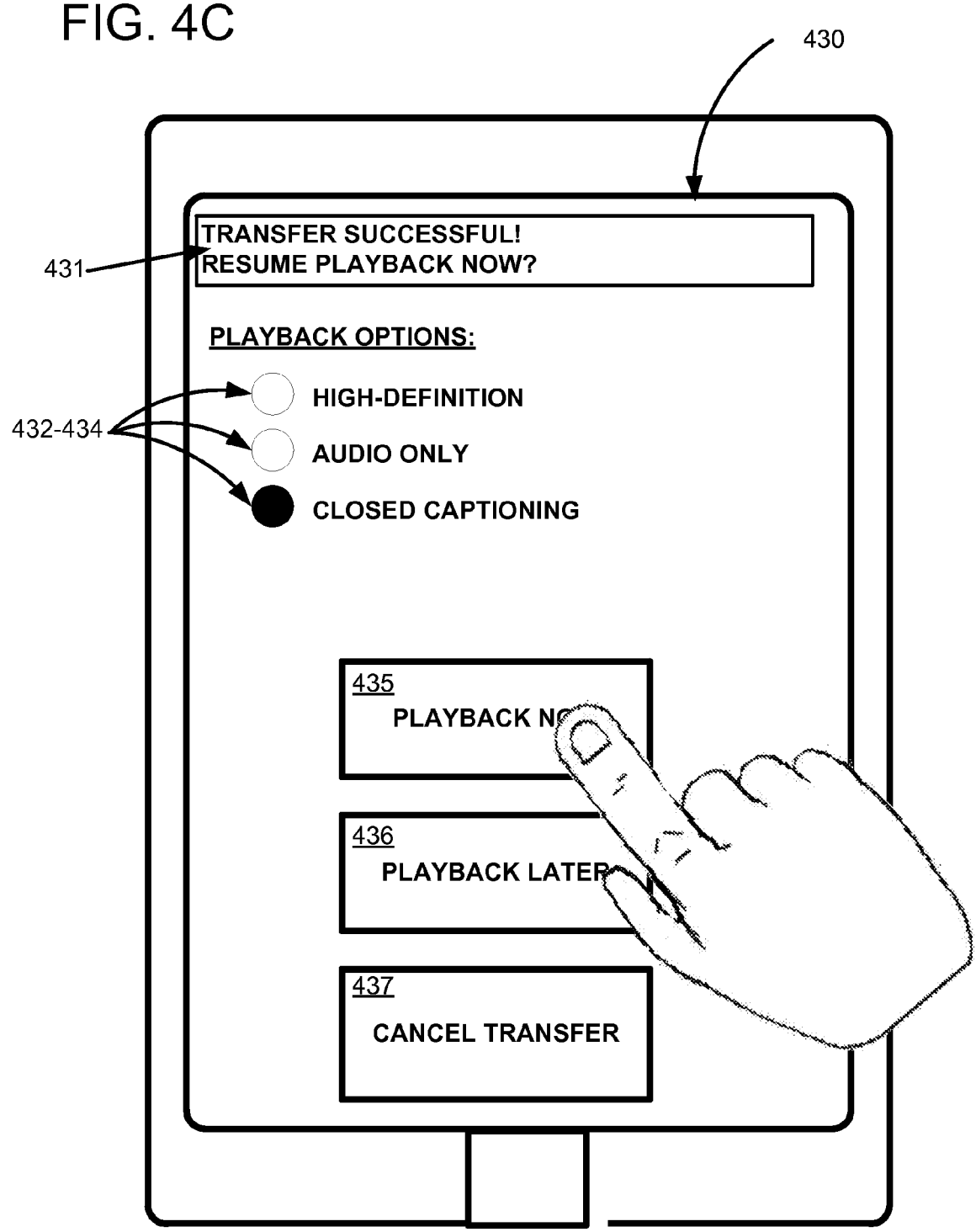

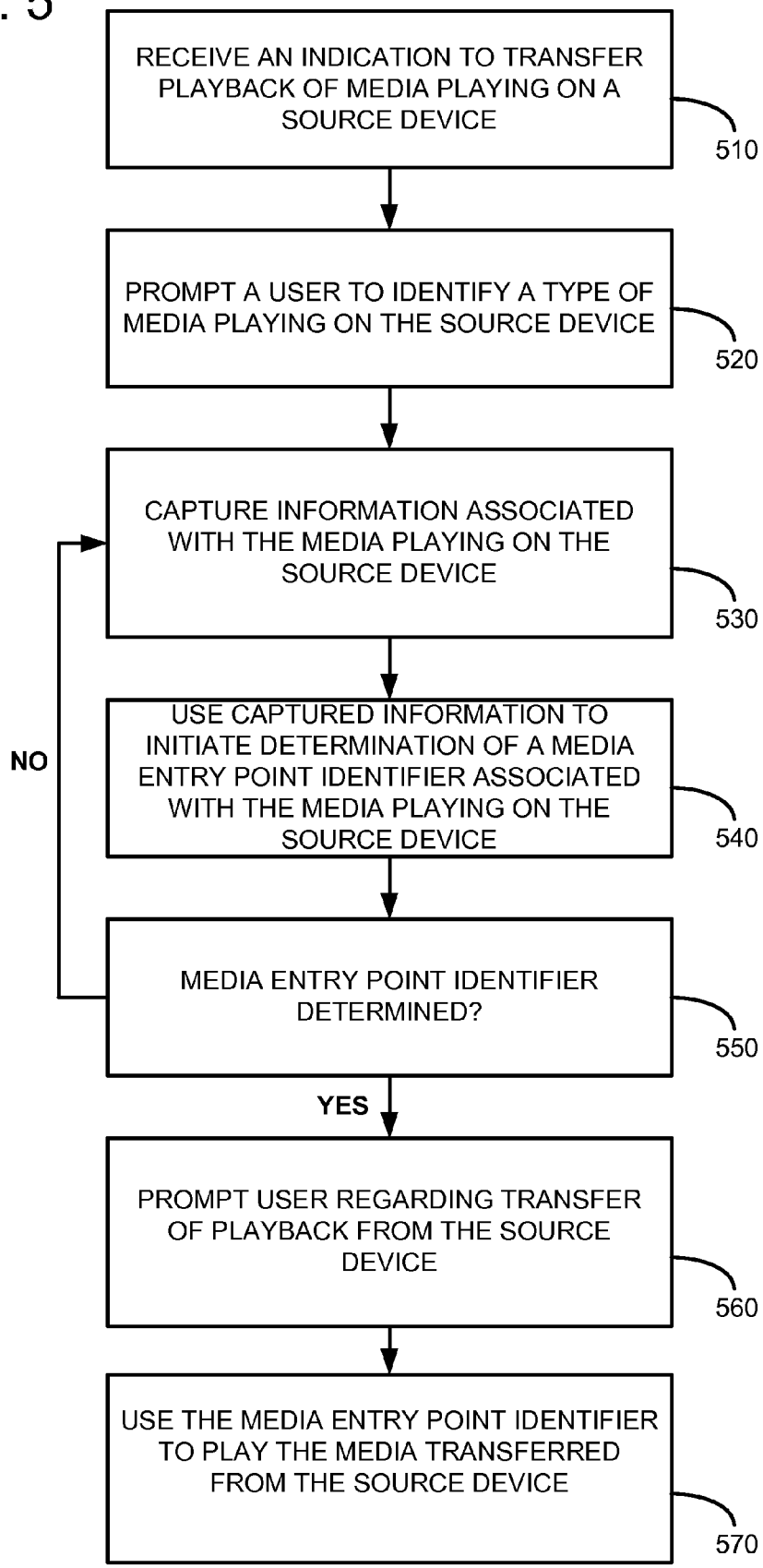

FIG.8
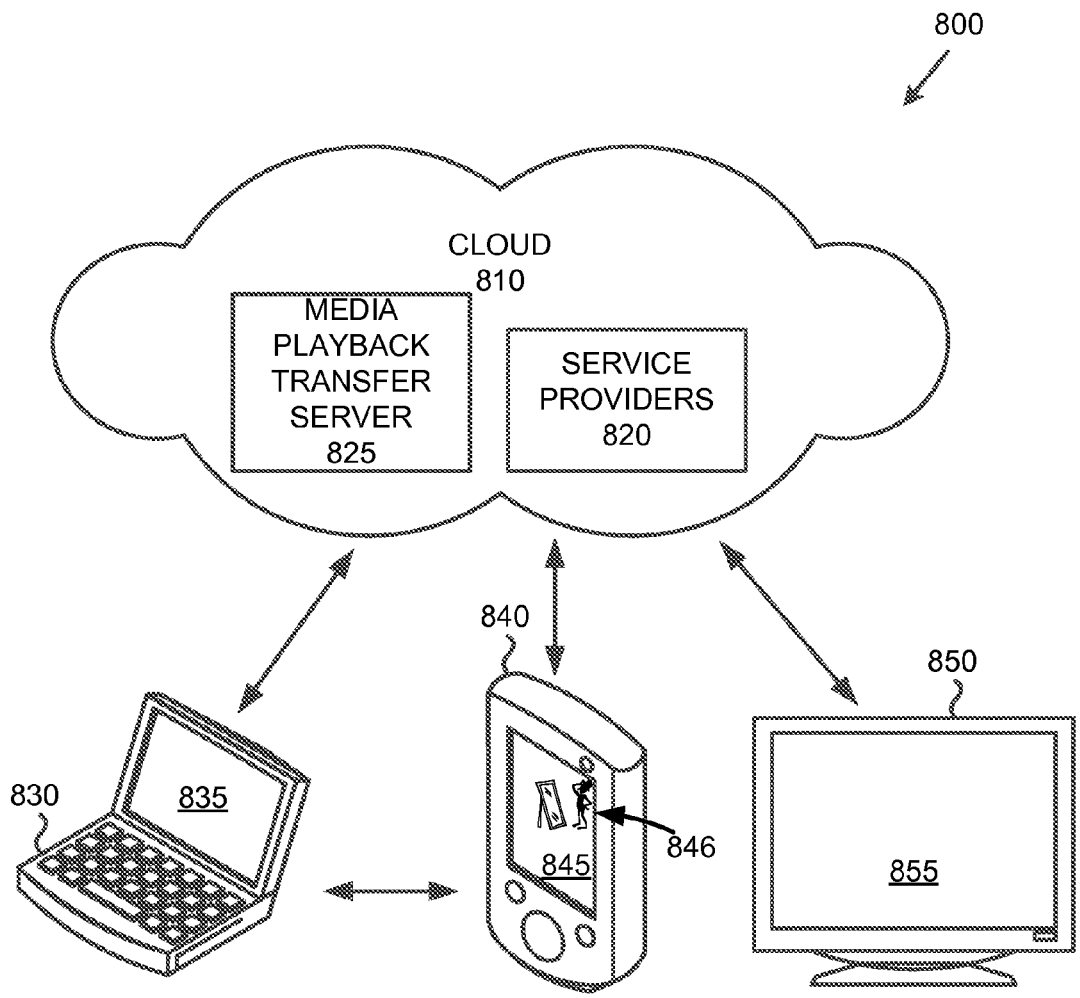
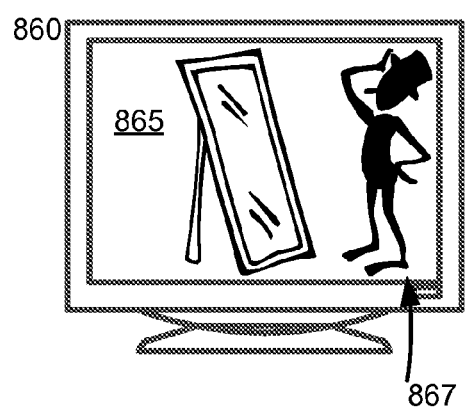

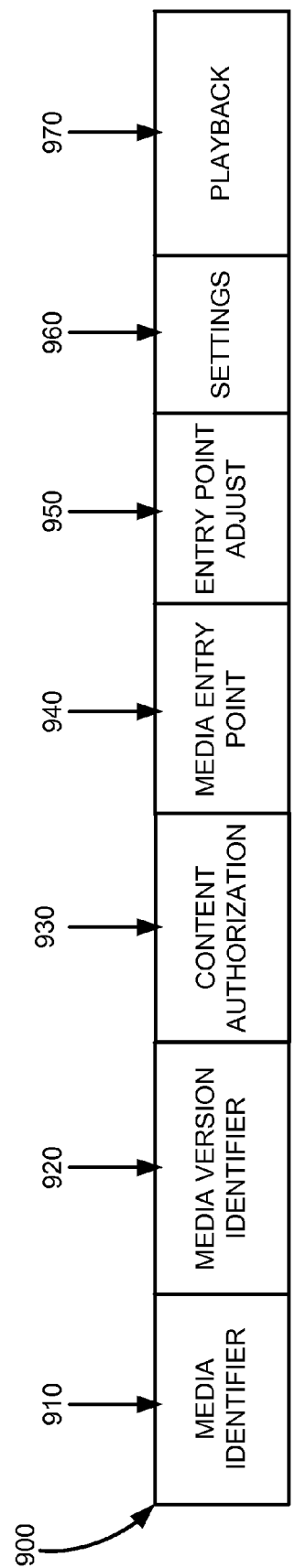

METHOD FOR TRANSFERRING MEDIA PLAYBACK FROM A DIFFERENT DEVICE

FIELD

The present application relates to playback of various media and, particularly, transferring playback of media from one device to another device.

BACKGROUND

Various devices allow playback of media. For example, a user may watch a video recording using a VCR connected to a television or by streaming the same video on his portable computer. Similarly, a user may listen to an audio recording by using a record player connected to stereo speakers or by using headphones connected to her smartphone. The formats of media and means for accessing a type of media are nearly limitless. Users often stop or pause playback of media and then continue playback at a later time or a different location. A simple example is a user pausing streaming playback of a video on his laptop, leaving the streaming application open on the laptop, and then continuing playback at a later time on that same application on the laptop. In this instance, because the video streaming application was never closed, the playback continues from the point at which the user paused. There are many instances, however, where the user is forced to resume playback of the media from the beginning of the media or spend time locating the location at which he originally paused the media. In such instances, the user wastes time and becomes frustrated at the process of cuing the media to the correct location.

Some media content providers allow users to stop playback on a media application, close the application, and then resume playback from the point at which playback was paused. Sometimes playback is resumed on a different device, possibly at a different location. One example provider of such playback is Netflix. Using a home PC, a user may log into her Netflix account and begin playing back a movie, for example by streaming the movie. At some point during play, the user pauses playback and leaves for the airport. At the airport, she then uses her laptop to log back into her Netflix account and resume playback of the media on her laptop. While providers such as Netflix may allow limited pause and playback on different devices, they all require the user to log into a particular account on both the first and second devices. No system or device, however, allows a user to transfer playback from one device to another without being logged into the same user account on both devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application relates to transfer of media playback from a first device to a second device.

In one embodiment, a QR code, or other visual language code, provides information to determine a version of the media playable on the second device and a media entry point for that media.

In another embodiment, audio and visual data are used to determine a version of the media playable on the second device and a media entry point for that media.

In yet another embodiment, media playback settings on the second device are adjusted to correspond with media playback settings on the first device.

BRIEF DESCRIPTION OF THE DRAWINGS

FIG. 2 is an exemplary flowchart of a method for determining a media entry point identifier for media playing on a source device.

FIG. 3 is an exemplary flowchart of a method for responding to a request for a media entry point identifier.

FIGS. 4A, 4B, 4C, and 4D show exemplary user interfaces that may be used to transfer playback from one device to another device.

FIG. 5 is an exemplary flowchart of a method for transferring media playback from a source device.

FIG. 8 is an exemplary network that can be used in transferring media playback from a first device to a second device.

FIG. 9 is an exemplary media entry point identifier that could facilitate transfer of media playback from a first device to a second device.

DETAILED DESCRIPTION

Figure 1:
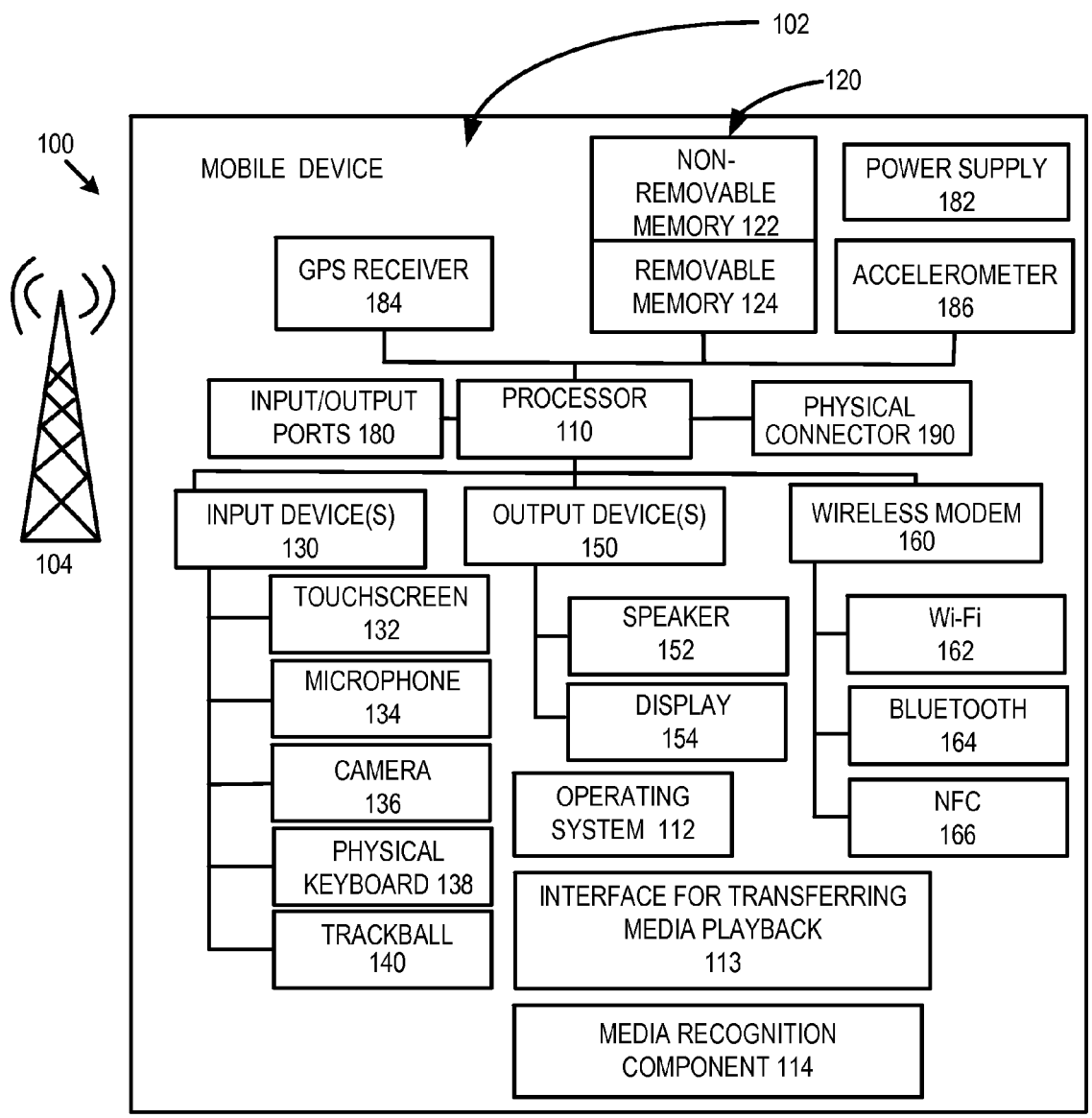
FIG. 1 is an exemplary mobile phone that can be used for transferring media playback from a first device to another device.

FIG. 1 is a system diagram depicting an exemplary mobile device 100 including a variety of optional hardware and software components, shown generally at 102. Any component 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for an interface for transferring media playback 113. The interface for transferring media playback can consist of an application or other program that allows a user to carry out transfer of media playback from one device to another device. A media recognition component 114 may also play a role in transferring media playback, for example, by processing information to determine the media to be played back as well as an entry point identifier for that media. The entry point identifier indicates, for example, the precise location within the media at which transferred playback is to begin. The media recognition component might, without limitation, comprise complete executable instructions for image recognition, such as Quick Response code ("QR code") recognition or key-frame recognition; audio recognition; or other data recognition and processing.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112, the interface for transferring media playback 113, and the media recognition component 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touch screen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems, such as, e.g., a Bluetooth modem 164, a Wi-Fi modem 162, or a near field communication ("NFC") modem 164. The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

FIG. 2 is a flowchart for an exemplary method for determining a media entry point identifier for media playing on a source device that may be used in transferring media playback from the source device to another device. This method can be provided, for example, on a handheld or other type of user device. In process block 210, an indication is received to transfer media playing on a source device. The indication may be, for example, based on a user input on a mobile device such as the device depicted in FIG. 1 to initiate transfer of media from the source device. There are many possible forms of user input, such as, for example, the user pushing or clicking a button, the user swiping her finger across a screen, the user speaking into a device with voice control, or the user simply holding the device in a certain position or moving the device in a certain way that indicates that the user expects a certain action. In one embodiment, sensors on the device may be used to recognize the particular device position or movement that indicates a certain action, such as placement of the device at a certain angle or rotation of the device in a certain plane. In another embodiment, the user input may come through near field communications ("NFC"), such as by the user touching or "tapping" a mobile device against a source device to indicate that transfer should occur. The user input might be made on the interface for transferring media playback 113, as described with respect to FIG. 1. The indication could also be a passive indication, based on an indirect action of the user, such as, for example, the user moving from one geographical area to another. In such an embodiment, the passive indication may be based upon information provided by a GPS device associated with the user or information provided by other sensors or components that allow a user's movement to be tracked. Another passive indication may be based on an event stored in the user's electronic calendar, for example on a user's mobile device. For example, if the user has a calendar entry at a particular time, an indication associated with media transfer can be provided based on the particular time of that calendar entry.

In process block 220, in response to the indication, a request is generated for a media entry point identifier for the media playing on the source device. The media entry point identifier can specify a specific media and a specific point within the media at which the transferred playback of the media begins. As an example, in one embodiment, if the indication to transfer media from the source device is received while the media on the source device is at a specific scene, then the media entry point identifier will contain information that identifies the specific media and so that playback of the media can begin at the specific scene. To allow for time lapse, the media entry point identifier may include information that causes the transferred media to resume playback a few seconds, a few minutes, or some other time period before or after the point at which the media playback transfer was initiated. The request for the media entry point identifier may be, for example, a signal transmitted to another device, server, or other network location requesting the media entry point identifier from the other device, server, or network location. Alternatively, the request could be made internal to the device where the indication is received. For example, upon receiving an indication to transfer media playing on a source device, a mobile device may generate an internal command requesting the media entry point identifier, for example, by sending the request to a processor or media recognition technology resident on the mobile device. The request for media entry point identifier may be accompanied with information that allows the media entry point identifier to be calculated.

In process block 230, a response to the request for the media entry point identifier is received. The response may be received from another device, server, or other network location. In one embodiment, the response may be received by a transceiver upon transmission over a wired or wireless network. In another embodiment, NFC may be used to transfer a media entry point identifier. Alternatively, the response may be received on the same device from which the request for the media entry point identifier originated. The response may include, for example, a media entry point identifier. Alternatively, the response may indicate that the media entry point identifier could not be determined. In the case that the response indicates that the media entry point identifier could not be determined, the response may also contain one or more data fields associated with the reasons why the media entry point identifier could not be determined.

FIG. 3 is a flowchart for an exemplary method for responding to a request for a media point identifier. In process block 310, captured information associated with media playing on a source device is received. The source device may include any device on which media may be played, including without limitation any device on which audio, video, text, images, slideshows, graphics, animations, or any combination thereof might be played or displayed. For example, the source device might be a television playing a movie being broadcast by a major television network, a screen in a movie theater, or the screen on a user's laptop. Alternatively, the source device might be a stereo system playing a radio program through speakers or a portable music device playing a song through headphones. Alternatively, the source device might be a TV screen on which playback of media has been momentarily paused or indefinitely terminated. In one embodiment, the source device could be a device similar to the mobile device shown in FIG. 1. The user device in this case may include any device capable of capturing information associated with media playing on another device. In one embodiment, the user device could be a device similar to the mobile device shown in FIG. 1.

The method of information capture can include any of various methods, including by camera, by microphone, by infrared or other wireless communication, or by manual entry. The information captured by the user device might include audio information, video information, textual information, metadata, or hidden or visible embedded information. For example, the capture information might include: a visual or audio snapshot of the media playing on the source device, a key-frame of the media playing on the source device, an audio portion of the media playing on the source device, a visual detection of a media progress bar corresponding to the media playing on the source device, a QR code or other type of visual language associated with the media playing on the source device, audio embedded in the media playing on the source device, video embedded in the media playing on the source device, a watermark associated with the media playing on the source device, and/or a barcode associated with the media playing on the source device. The captured information may also include information on the settings of the source device such as, for example, volume, brightness, contrast, playback speed and/or resolution, tone or other audio settings, or other settings. Some or all of the captured information may include information captured from the source device through NFC, for example, upon the touching or "tapping" of the source device.

In process block 320, the captured information is used in an attempt to calculate or determine a media entry point identifier associated with media playing on the source device. For example, a media recognition component might be used to calculate the media entry point identifier based on captured video information, captured audio information, or a combination of captured audio and video information. Alternatively, or in addition, determination of the media entry point identifier may involve use of data contained in a QR code, bar code, watermark, or other type of metadata or embedded data. Alternatively, or in addition, determination of the media entry point identifier may involve processing or analyzing an image of the media progress bar corresponding to the media playing on the source device.

In decision block 325, if calculation of a media entry point identifier is successful then the media entry point identifier is provided to facilitate transfer playback from the source device (process block 340). If calculation of a media entry point identifier is not successful then an identification of why the calculation was unsuccessful is made in a process block 330, along with a request to capture additional information. The identification of why the calculation was unsuccessful might identify any deficiencies in the captured information that prevented the media entry point identifier from being successfully calculated. For example, the identification of why the calculation was unsuccessful might specify that provided audio information was inaudible or contained too much background noise, that provided video information was too blurry to allow for proper pattern recognition, and/or that a captured visual code could not be matched. The request to capture additional information might be a general request to simply attempt recapture of the information in the same manner previously used to capture the information. Alternatively, or in addition, a more specific request may be issued to recapture the information in a particular manner, e.g., by holding the user device more still during capture or by holding the user device closer to the source device during capture. Additionally, the request may include a request for additional forms of information. For example, if the original captured information only included video information, the request for capture of additional information may include a request for capture of audio information. In one embodiment, the attempt to calculate a media entry point identifier may be unsuccessful because several non-unique media are identified. In such an embodiment, the request for additional captured information could consist of requesting the user to choose or identify the captured media from among a list of potential non-unique media that is, for example, displayed on the user's mobile device. Such a request could be provided to the user as, for example, an audio message or a displayed message.

In process block 340, the media entry point identifier is provided in order to facilitate transfer of playback from the source device. As previously discussed, the media entry point identifier contains information indicating where to begin playback of the transferred media.

Figure 4A:
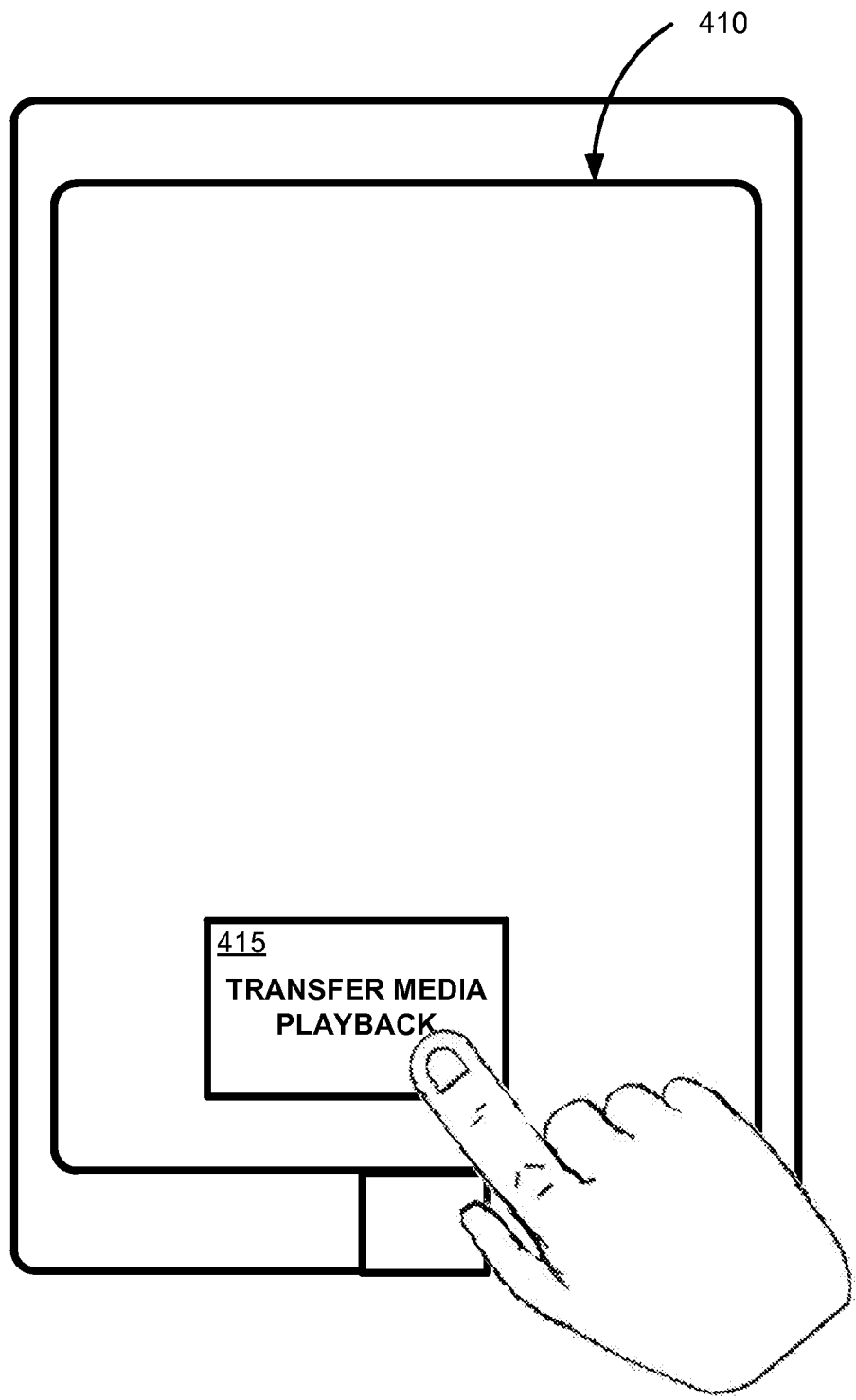
Figure 4B:
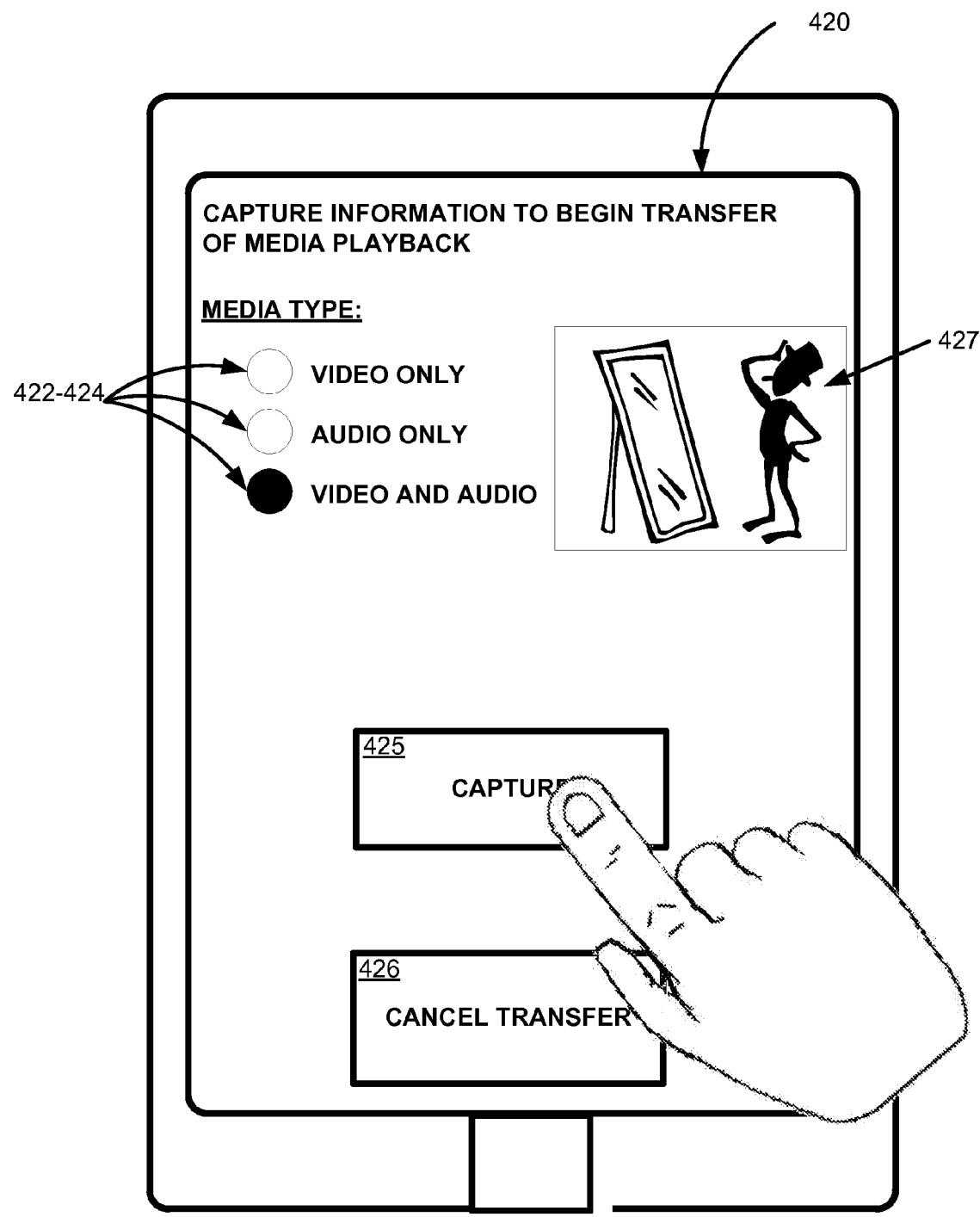

FIGS. 4A-4B show example interfaces on a mobile device for transferring media playback from a source device to another device. FIG. 4A shows an example of how a user might use a mobile device to initiate transfer of media playback from a source device. In an example user interface window 410, the user selects a user input area displayed as a button 415 in a display scene to initiate transfer of media playback from the source device to another device. While a button is shown, an indication to transfer media playback can be made in other ways, including without limitation indications based on a gesture, a button click, a voice command, a swipe, or a passive indication such as a change of the user's geographical location. Once the user initiates transfer, the device may prompt the user for additional information in order to effectuate media playback transfer. When the user initiates transfer, the mobile device may, for example, launch an application that facilitates transferring media playback.

FIG. 4B shows an example of a mobile device configured to capture information to be used in calculating a media entry point identifier that allows transfer of media playback. Example user interface window 420 provides the user with options fields 422-424 for specifying the media type 421 to be captured using associated radio buttons along with an image capture display 427 that allows the user to view the image being captured in the case of video capture. Once the user has provided information on media type, he or she may select the capture button 425 to capture the media from the source device. If the user decides not to transfer media playback, he or she may select the cancel transfer button 426 to cancel the transfer of media playback.

FIG. 4C shows an example of a user interface 430 presented to a user after the media entry point identifier has been calculated. The user interface window 430 may contain a status field 431 configured for display of a status message to inform the user that the media playback transfer was successful and prompt the user with playback options provided in associated options fields 432-434 for the user. Upon selecting a playback option, the user may then select a button 435 to play back the transferred media immediately. In this case, a version of the media playable on the mobile device is transferred to the mobile device, for example, by downloading or streaming the media to the mobile device through a wireless network. Alternatively, the user may select a button 435 to play back the transferred media later. In this case, the user may be prompted to download the media immediately, so that it would be readily accessible at a later time, even if the user were out of network range. Not all possible user options are presented in the depicted embodiment and the user may be presented with additional options. For example, the user may be given the option of downloading the media for playback later on the mobile device or of transferring the playback to yet another device. The user may alternatively select a button 437 to cancel the media playback transfer. In one embodiment, the device may passively monitor the media playing on the source device and, for example upon certain conditions, prompt the user as to whether the user wants to continue the content. In such an embodiment, the user may be prompted to transfer playback without actively initiating the transfer of media playback or affirmatively capturing information.

Figure 4D:
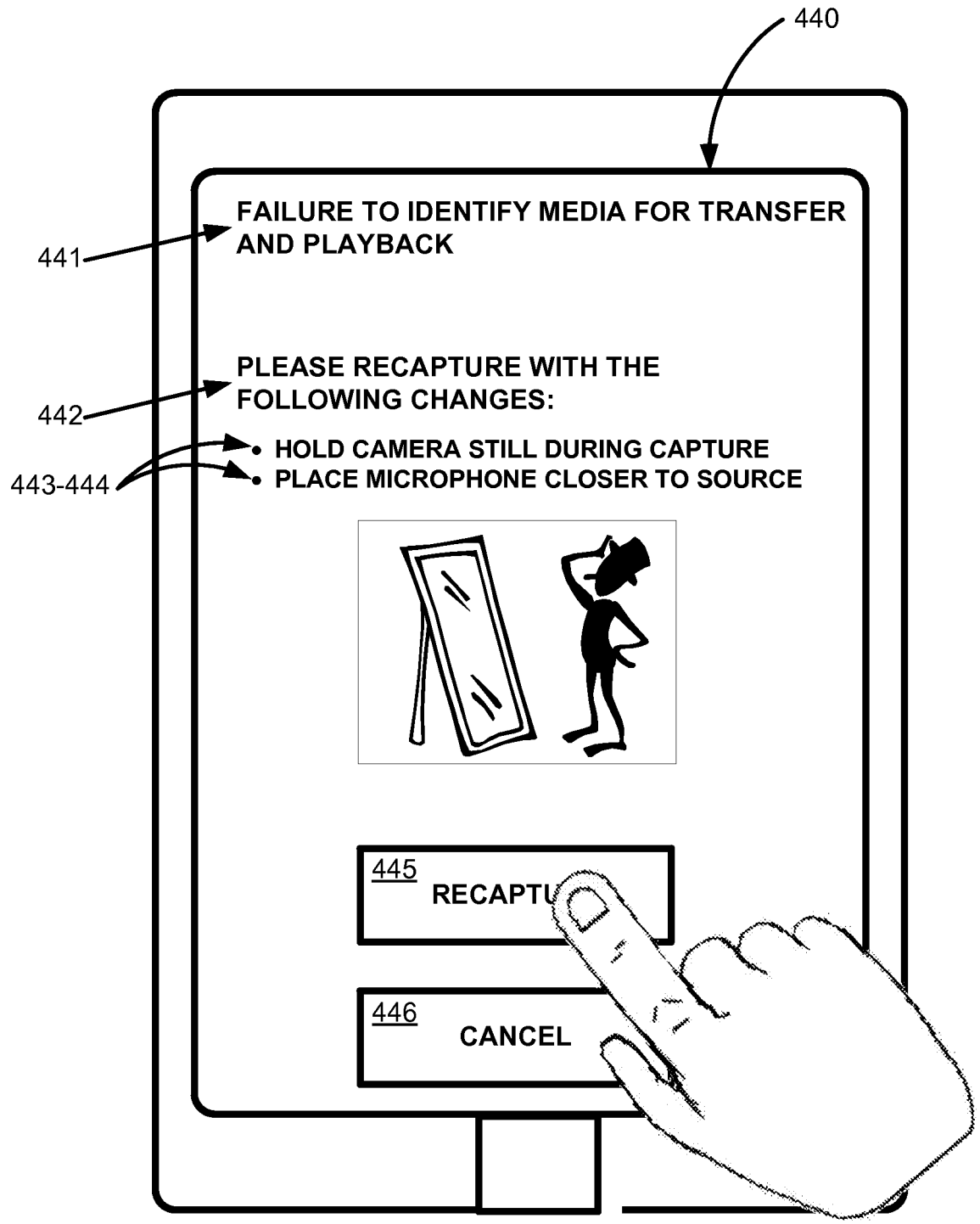

FIG. 4D shows an example of an interface presented to a user after an unsuccessful attempt to calculate the media entry point identifier. The user interface window 440 may display a status message in a capture status field 441 to inform the user of a failure to identify the media for transfer and playback. Such a message might be displayed, for example, upon a failure to calculate a media entry point identifier or associated media. The user interface window might also include a recapture field 442 configured to recover a user request to recapture the information after making certain capture changes provided to the user in display fields 443-444. The user can then account for these suggestions when selecting a recapture button 445. The user may alternatively select a button 446 to cancel the media playback transfer.

While FIGS. 4A-4B show example interfaces on a mobile device, it should be understood that media playback transfer disclosed herein includes transfer of media playback from any source device to any other device. For example, in one embodiment media playback transfer from a mobile device, such as a smartphone or electronic reader device, to a more stationary device, such as a television can be provided. In such an embodiment, the television may contain many or all of the same sensors and capture mechanisms described herein, such as microphones, cameras, or near-field communication transceivers and associated detection technologies.

FIG. 5 is a flowchart of an embodiment of a method for transferring media playback from a source device. In process block 510, an indication to transfer playback of media playing on a source device is received. In process block 520, a user is prompted to identify a type of media playing on the source device. Media types may include, but are not limited to any one or a combination of audio, video, text, or graphics. The user may be prompted by user a media type checklist and/or by being provided with a text entry box that allows the user to specify a type of media. In process block 530, information associated with the user-specified media types is captured. Captured information might include, but is not limited to a snapshot of the media playing on the source device, a keyframe of the media playing on the source device, an audio snippet of the media playing on the source device, a visual detection of a media progress bar corresponding to the media playing on the source device, a visual language code such as a QR code associated with the media playing on the source device, audio embedded in the media playing on the source device, video embedded in the media playing on the source device, a watermark associated with the media playing on the source device, and a bar code associated with the media playing on the source device. While capture can occur in any way, including the ways disclosed herein, some or all of the information capture may occur through NFC, for example, upon the touching or "tapping" of the source device.

In process block 540, the captured information is used to initiate determination of a media entry point identifier associated with the media playing on the source device. The manner in which the media entry point is determined will depend on the type and amount of captured information. If only one type of captured information is provided, then an attempt at determination of the media entry point will be made using just that information. In one embodiment, multiple types of captured information will be used in an attempt to determine the media entry point identifier. In general, the more types of captured information used, the greater the likelihood that a media entry point identifier will be determined. For example, media recognition technology might be used to calculate the media entry point identifier based on captured video information, captured audio information, or a combination of captured audio and video information. Alternatively, or in addition, determination of the media entry point identifier may involve use of data contained in a QR code, bar code, watermark, or other type of metadata, visual language, or embedded data. Alternatively, or in addition, determination of the media entry point identifier may involve processing or analyzing an image of the media progress bar corresponding to the media playing on the source device.

In decision block 550, if calculation of a media entry point identifier is successful then the user is prompted regarding the transfer of playback from the source device (process block 560) and then transfers playback of the media from the source device (process block 570). If calculation of a media entry point identifier is not successful then additional information is captured (process block 530) and determination of a media entry point identifier is initiated once again (process block 540). This process continues until a media entry point is determined or the user aborts the attempts at media entry point determination.

In process block 560, a user is prompted regarding transfer of playback from the source device. The user may be presented with a number of options for transferring media playback from the source device. For example, the user may be given the option of immediately transferring the media playback to a specific device in the user's possession or postponing playback for a later time on a different device. The user may also be given a number of different playback options. For example, if the media captured from the source device was video and audio, then the user may be given the option of transferring playback such that only the video plays, but with closed captioning text at the bottom. In another example, if the media captured from the source device was a music video, then the user may be given the option of transferring playback such that only the audio plays.

In process block 570, the media entry point identifier is received by a media player, and pay at the media entry point begins. As previously described, the media entry point identifier contains information identifying the media transferred as well as the specific point within the transferred media at which playback is to resume. In one embodiment, the media entry point identifier also contains information regarding the settings of the source device, such as volume, brightness, or contrast. In such an embodiment, the settings of the source device are applied to the device to which the media playback is transferred before playback of the media transferred from the source device is begun. In another embodiment, the media entry point identifier also contains content authorization information, such as confirmation that a license for the media has been obtained or information presentable to the user that allows the user to choose whether to license the content. In another embodiment, the user device is associated with a user account that is different from the user account associated with the source device. In another embodiment, the user device is associated with a service provider that is different from the service provider associated with the source device. In another embodiment, the source device is not associated with a user account or a service provider.

Figure 6:
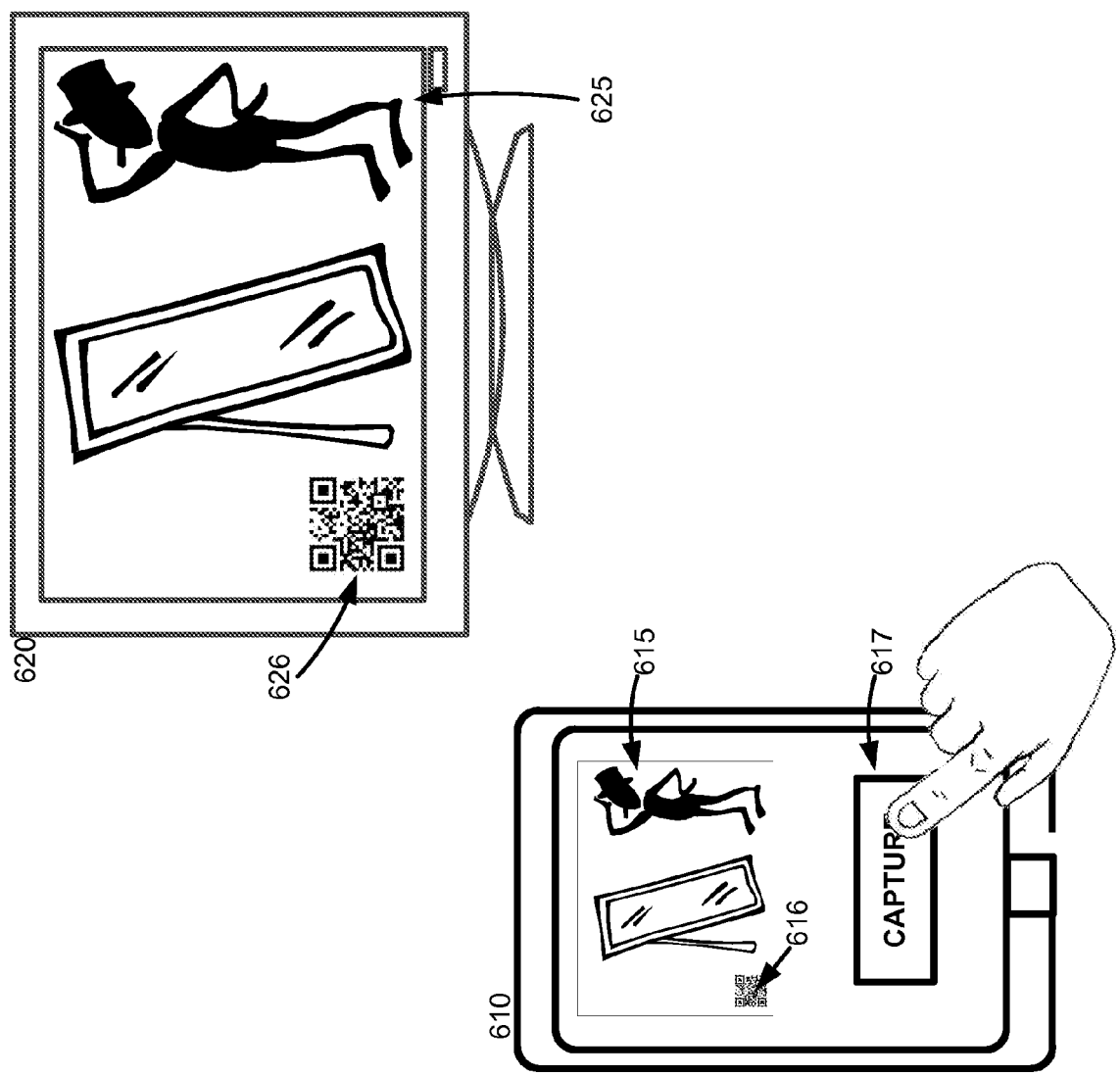
FIG. 6 is an embodiment showing a user using a user device to capture information from a source device in order to transfer media playback from the source device.

FIG. 6 shows an example of how a user device 610 can obtain captured information from a source device 620. The source device 620 is playing media 625 that may include some type of embedded data, such as a QR code 626. The user device 610 may contain a capture device such as, for example, a camera. In this particular embodiment, the user may employ a camera on the user device 610 to frame an image of the media playing on the source device 615, as well as the QR code 616 displayed on the source device. Once the user properly frames the image, she can select a capture button 617 on the user device 610 in order to capture the image. In this example, the embedded data is provided in the media, but in other examples data can be generated and displayed upon playback. In one such example, a QR code is provided or displayed in, on, or next to media content. The QR code also may be provided or displayed in, on, or next to media content when the media content is paused.

Figure 7:
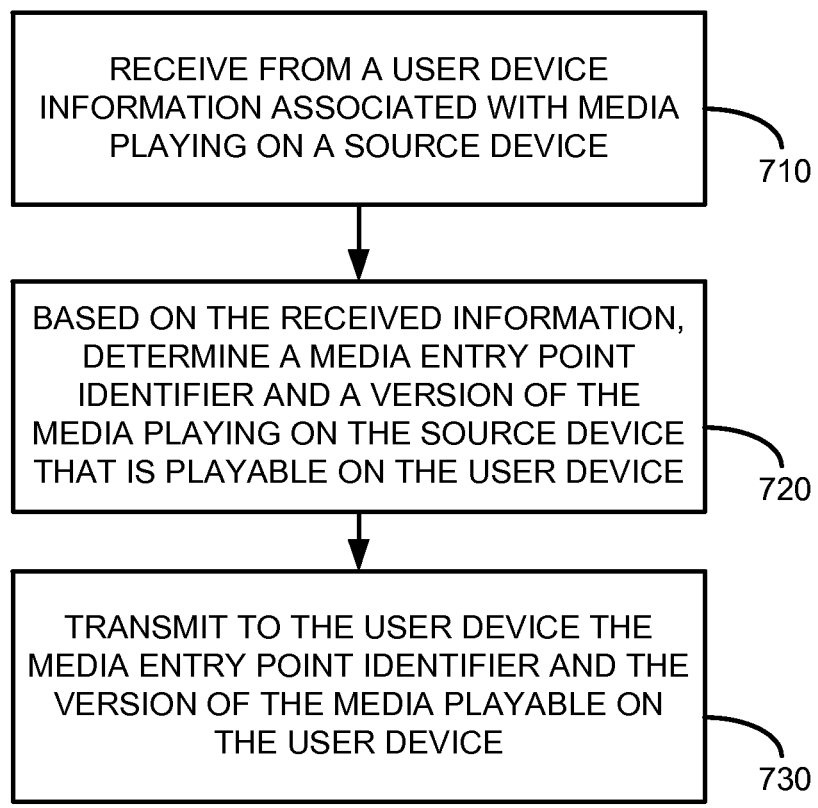
FIG. 7 is an exemplary flowchart of a method for responding to a request from a user device for media playable on the device and a corresponding media entry point identifier.

FIG. 7 is a flowchart of an embodiment of a method for responding to a request for a media entry point identifier and a version of transferred media playable on a specific device. This or similar methods could be used by, for example, a remote media playback transfer server to determine media entry point identifiers and media versions to be used when transferring media playback from one device to another. In process block 710, information associated with media playing on a source device is received from a user device. In process block 720, the information associated with the media playing on the source device is used to determine a media entry point identifier and a version of the media playing on the source device that is playable on the user device. For example, if the user device is a smartphone or other type of small portable device with only cellular data access, then the determined media version may be lower-resolution than if the user device had a stable high-bandwidth network connection and a high-definition output device. In one embodiment, the version of the media playable on the user device is optimized to the particular user device based on the network connectivity of the user device, the screen resolution of the user device, and the audio capabilities of the user device. In process block 730, the media entry point identifier and version of the media playable on the user device are both transmitted to the user device. Transmission may occur via wired or wireless transmission methods. In one embodiment, transmission will occur as a download to the user device. In another embodiment, transmission will occur as a stream to the user device.

FIG. 8 illustrates a generalized example of a suitable implementation environment 800 in which described embodiments, techniques, and technologies may be implemented.

In example environment 800, various types of services (e.g., computing services) are provided by a cloud 810. For example, the cloud 810 can comprise a collection of computing devices 830, 840, 850, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices) while other tasks (e.g., storage of data to be used in subsequent processing or access and use of information stored on a remote server) can be performed in the cloud 810.

In one example, the cloud 810 can store a media database, which includes information on different types and versions media, and which may be referenced in effecting transfer of media playback from a source device to a user device. The cloud 810 may contain a particular media playback transfer server 825 that may contain information on various types and versions of playable media, as well as computational capability for determining a media entry point identifier as well as specific versions of media playable on certain types of devices. The media playback transfer server 825 may also contain information specific to certain users, such as all media entry point identifiers associated with a certain user, so as to facilitate transfer of media playback to any device connected to the cloud 810. As one example, a user may use connected device 840 to transfer media playback from disconnected device 860. To do so, the user may capture information from the source device onto the connected device 840. In the example shown, the user captures an image 867 from the disconnected device 860 onto the user device 840. This captured information 846 may then be transmitted to the cloud, where it is received by the media playback transfer server 825. The media playback transfer server 825 uses the captured information to determine a media entry point identifier and a version of the media playable on one of the connected devices 830, 840, 850. The media entry point identifier and playable version of the media are both then transmitted to one or all of the connected devices 830, 840, 850 to facilitate transfer of media playback to the connected devices. In addition, some of the connected devices 830, 840, 850 may also communicate with one another outside the cloud, as is shown between connected devices 830 and 840. In such instance, a media entry point identifier and playable media version may be transmitted between devices outside of the cloud. In one embodiment, for example, a media entry point identifier and playable media or related information may be transmitted between devices using a Bluetooth communication protocol or, upon "tapping" of the devices, through NFC.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as a desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, or the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touch screen capabilities. Touchscreens can accept input in different ways. For example, capacitive touchscreens detect touch input when an object (e.g., a fingertip or stylus)

distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touch screen capability of a particular connected device (e.g., connected devices 830, 840, 850). Different devices on the cloud may be associated with different service providers. Any disconnected device 860 is not part of the cloud and may be associated with no service providers or, alternatively, with service providers that are not associated with the cloud. Disconnected device 860 may also contain a screen 865.

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

FIG. 9 shows one possible embodiment of a media entry point identifier 900. The media entry point identifier 900 may contain multiple data fields 910, 920, 930, 940, 950, 960, and 970. A media identifier data field 910 may, for example, contain information that allows identification of the media to be transferred based on the media entry point identifier 900. In particular embodiments, the media identifier data field 910 contains the name of a movie or song or, more specifically, a code associated with a particular release of a movie or song. A media version identifier data field 920 may, for example, contain information that identifies a particular version of media to be transferred. For example, the media version identifier data field 920 might allow for identification of a specific version of the media that is playable on a particular device such as a user's mobile device. A content authorization data field 930 may, for example, contain content authorization information such as a license to play the media to be transferred on a particular device or to play a particular version of the media to be transferred. A media entry point data field 940 may, for example, contain information that allows identification of a specific playback resumption point within the media to be transferred, i.e., a specific point within the media at which the transferred playback may begin. An entry point adjust data field 950 may, for example, contain content information specifying time adjustment of the media entry point. Based upon this time adjustment information, playback of the transferred media may begin before or after the time specified by the media entry point. A settings data field 960 may, for example, contain information on settings to be applied to the device on which transferred playback will occur. Data contained in the settings data field 960 may be based upon settings found on a source device at the time of initiation of media playback transfer. A playback data field 970 may, for example, contain information on when playback of the transferred media should begin and on what device it should begin. For example, based on data in the playback data field 970, playback of the transferred media may begin immediately on a user's device. Alternatively, based on data in the playback data field 970, playback of the transferred media may be postponed until a later time on a device not yet identified. In one embodiment, based upon data in the playback field, playback of the transferred media may begin at a specific time on a specific device. It should be understand that once calculated or determined, the media entry point identifier 900 may be transmitted or otherwise passed from one device to another, for example, by transmission over a wired or wireless network. The media entry point identifier 900 need not be associated with any one device. In one embodiment, transfer of media playback can occur on various types of devices based upon the media entry point identifier 900.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Similarly, the methods and systems disclosed herein are not limited to any particular type of messaging application and may include message applications provided with a device, message applications provided by third parties, or both. Additionally, if a messaging service is integrated within an operating system, then the operating system may perform the steps and procedures disclosed herein as performed by applications. In some situations, an Application Programming Interface (API) or a Messaging Application Programming Interface (MAPI) may be used when carrying out the methods or implementing the systems disclosed herein. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosure may be applied, it should be recognized that the illustrated embodiments are only preferred examples and should not be taken as limiting the scope of the disclosure. We claim all that comes within the scope and spirit of the appended claims.

We claim:

1. In a user device, a method, comprising:
   receiving an indication to transfer media playable on a source device;
   capturing information associated with the media playable on the source device;
   requesting a media entry point identifier for the media playable on the source device, wherein the request for the media entry point identifier is associated with information based at least in part on the captured information; and
   receiving a response to the request for the media entry point identifier.

2. The method of claim 1, wherein the media playable on the source device is media playing on the source device.

3. The method of claim 1, wherein the response to the request for the media entry point identifier comprises one of a media entry point identifier or an indication of a failure to identify a media entry point identifier.

4. The method of claim 1, further comprising receiving on the user device an authorized version of the media playable on the source device that is playable on the user device.

5. The method of claim 1, further comprising playing on the user device a version of the media playable on the source device.

6. The method of claim 1, further comprising receiving metadata associated with the media playable on the source device.

7. The method of claim 1, further comprising receiving media playback settings associated with the source device.

8. The method of claim 1, wherein the indication comprises a user indication comprising one of the following: a gesture, a button click, a voice command, a swipe, or a passive indication.

9. The method of claim 1, wherein the captured information comprises a visual code.

10. The method of claim 1, wherein the captured information comprises two or more of the following: a snapshot of the media playable on the source device, a key-frame of the media playable on the source device, an audio snippet of the media playable on the source device, a visual detection of a media progress bar corresponding to the media playable on the source device, a visual code associated with the media playable on the source device, audio embedded in the media playable on the source device, video embedded in the media playable on the source device, a watermark associated with the media playable on the source device, and a bar code associated with the media playable on the source device.

11. The method of claim 1, further comprising sending the captured information to a server and receiving a version playable on the user device of the media playable on the source device.

12. At least one computer-readable storage having instructions stored thereon for causing a user device programmed thereby to perform a method, wherein the at least one computer-readable storage is selected from the group consisting of hard disk storage, flash memory, read-only memory and optical media disk, the method comprising:
   receiving an indication to transfer media playable on a source device;
   capturing information associated with the media playable on the source device;
   requesting a media entry point identifier for the media playable on the source device, wherein the request for the media entry point identifier is associated with information based at least in part on the captured information; and
   receiving a response to the request for the media entry point identifier.

13. A user device, comprising:
   one or more capture devices for capturing information related to media playable on a source device;
   a transceiver configured to request a media entry point identifier and provide information based at least in part on the captured information; and
   a user interface configured to receive a user indication to transfer media playback to the user device from the source device and to allow user capture of information associated with the media playable on the source device.

14. The user device of claim 13, wherein the one or more capture devices are configured to capture and process two or more of the following information types: a snapshot of the media playable on the source device, a key-frame of the media playable on the source device, an audio snippet of the media playable on the source device, a visual detection of a media progress bar for the media playable on the source device, a QR code for the media playable on the source device, embedded audio for the media playable on the source device, embedded video for the media playable on the source device, a watermark for the media playable on the source device, and a bar code for the media playable on the source device.

15. The user device of claim 13, further comprising a processor configured to determine the media entry point identifier and a version playable on the user device of the media playable on the source device.

16. A method, comprising:
   receiving from a user device information associated with media playing on a source device along with a request to transfer media playback from the source device to the user device, wherein the received information is based at least in part on captured information associated with the media playing on the source device;
   based on the received information, determining a version of the media playing on the source device that is transmittable to the user device and playable on the user device;

based on the received information, determining a media entry point identifier corresponding to the received information associated with media playing on the source device; and transmitting the transmittable and playable version of the media to the user device.

17. The method of claim 16, wherein the received information from the user device comprises at least two of the following: a snapshot of the media playing on the source device, a key-frame of the media playing on the source device, an audio snippet of the media playing on the source device, a visual detection of a media progress bar corresponding to the media playing on the source device, a visual code containing information relating to the media playing on the source device, audio embedded in the media playing on the source device, and video embedded in the media playing on the source device.

18. The method of claim 16, further comprising transmitting to the user device a request to capture additional information in order to determine the media entry point identifier.

19. The at least one computer-readable storage of claim 12, wherein the response to the request for the media entry point identifier comprises one of a media entry point identifier, an indication of a failure to identify a media entry point identifier, and a request to capture additional information in order to determine the media entry point identifier.

20. The at least one computer-readable storage of claim 12, wherein the captured information comprises two or more of the following: a snapshot of the media playable on the source device, a key-frame of the media playable on the source device, an audio snippet of the media playable on the source device, a visual detection of a media progress bar corresponding to the media playable on the source device, a visual code associated with the media playable on the source device, audio embedded in the media playable on the source device, video embedded in the media playable on the source device, a watermark associated with the media playable on the source device, and a bar code associated with the media playable on the source device.

* * * * *